July 12, 1949.  W. E. GERBING  2,475,954
VARIABLE SPEED PULLEY
Filed Oct. 21, 1946
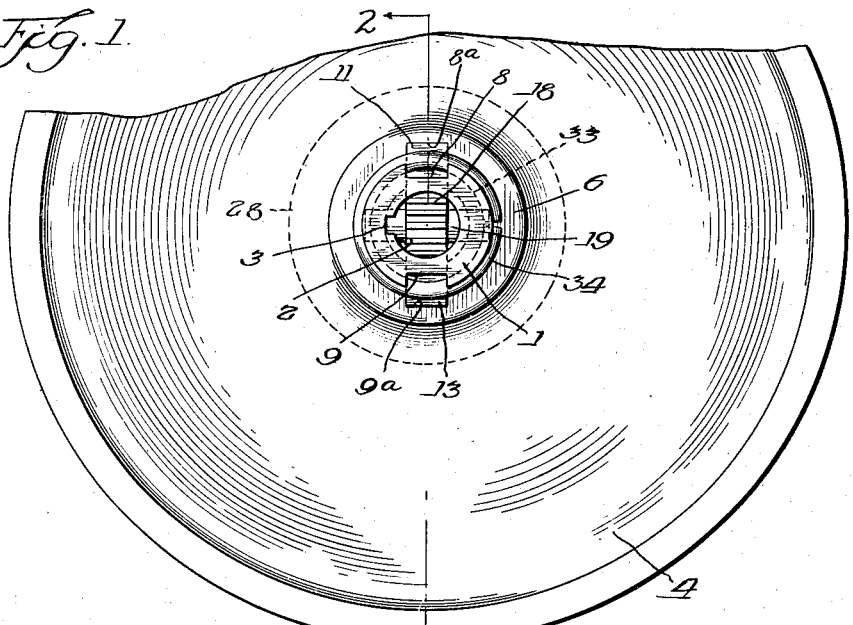
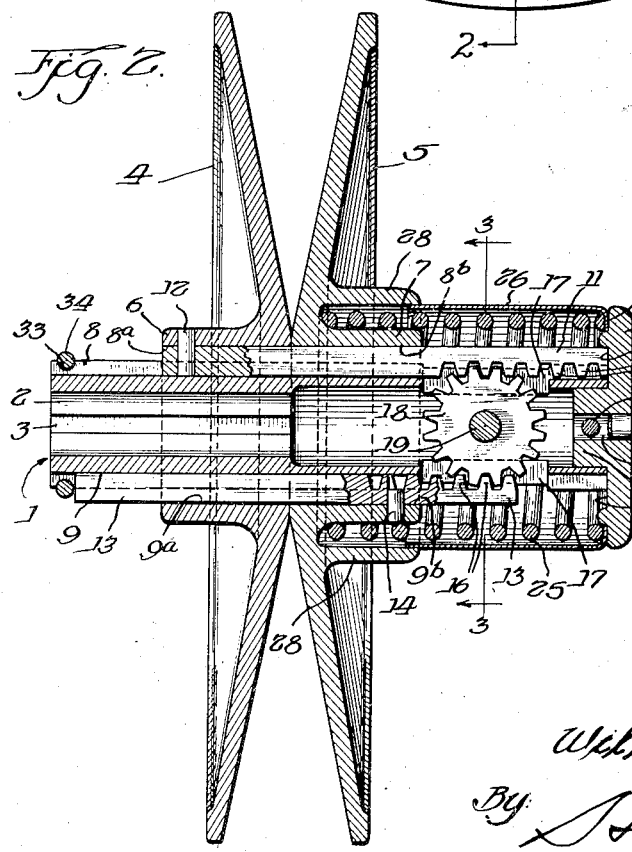
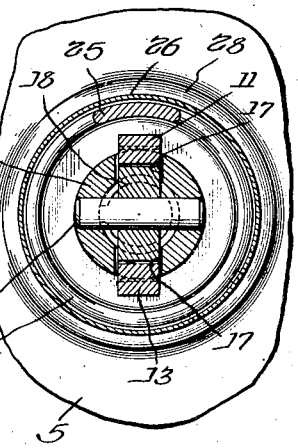
Inventor:
Willard E. Gerbing
By Lee & Lee Attys.

Patented July 12, 1949

2,475,954

UNITED STATES PATENT OFFICE 2,475,954

VARIABLE SPEED PULLEY

Willard E. Gerbing, Chicago, Ill.

Application October 21, 1946, Serial No. 704,585

11 Claims. (Cl. 74—230.17)

The invention relates generally to pulleys, and more particularly to a variable pitch type of pulley.

The invention has among its objects the production of a pulley in which the pitch diameter thereof may be varied without varying the belt center line, the pulley being so constructed that the pulley discs or sleeves are positively locked to the driving shaft at all times, at the same time permitting changes in the pitch diameter of the pulley.

Another object of the invention is the production of such a pulley, in which the operating range from maximum to minimum pitch diameters may be much greater than previous pulleys of this type, and which may be readily constructed, if desired, for multiple belt operation.

Another object of the invention is the production of such a pulley, which is very simple and durable in construction, having relatively few moving parts, and which is relatively inexpensive to manufacture.

A further object of the invention is the production of such a pulley, in which the moving parts may be readily lubricated without utilizing relatively long lubrication passages.

Many other objects and advantages of the present construction herein shown will be obvious to those skilled in the art from the disclosure herein given.

To this end my invention consists in the novel construction, arrangement and combination of parts herein shown and described, and more particularly pointed out in the appended claims.

In the drawings, wherein like reference characters indicate like or corresponding parts;

Fig. 1 is an end elevational view of a pulley embodying the present invention;

Fig. 2 is a sectional view taken approximately on the line 2—2 of Fig. 1; and

Fig. 3 is a sectional view taken approximately on the line 3—3 of Fig. 2.

In the past, spring biased variable pitch pulleys have been produced in which the provision is made for separating the opposed pulley halves or discs to permit the belt to ride between the discs at points of different pitch diameters. However, the mechanism for equally distributing the disc movement to maintain the belt on a fixed center line, has also carried the driving torque between the pulley shaft and the pulley discs.

In the present invention the pulley halves or discs are keyed to the pulley shaft and to each other, thus preventing any relative movement between either the discs or between the discs and the pulley shaft. Likewise, as the disc separating mechanism does not carry any of the driving torque, these parts may be made proportionately smaller and lighter, resulting in a saving in weight, as well as a reduction in the size of the device.

Referring to the drawings, and particularly to Fig. 1, 1 designates a pulley shaft member having a bore 2 therein of a size to receive a driving shaft, as for example, a motor shaft key-way 3 being provided for cooperation with a similar key-way on the motor shaft, whereby the two shafts may be locked together by a key positioned in the two key-ways. Slidably carried on the shaft member 1 are a pair of pulley halves or discs indicated generally by the numerals 4 and 5 respectively, each having a hub portion 6 and 7 respectively of sufficient length to insure satisfactory rigidity of the discs 4 and 5 during operation.

The shaft 1 is also provided with a pair of diametrically positioned key-ways 8 and 9, aligned with similar key-ways 8ª and 9ª in the hub 6, and the key-ways 8ᵇ and 9ᵇ in the hub 7. Positioned in the key-ways 8, 8ª and 8ᵇ is a key member 11, the latter being secured to the hub 6 by a pin 12 secured to the respective members by a press fit. Similarly a key member 13 is positioned in the key-ways 9, 9ª and 9ᵇ, and secured to the hub 7 by a pin 14, a press fit also being employed to retain the respective parts in engagement. Thus the key members 11 and 13, insofar as the torque is concerned, securely lock the discs 4 and 5 to the shaft 1 and to each other. Both the key members 11 and 13 are provided with oppositely disposed gear teeth 15 and 16 respectively. The shaft 1 is also provided with a transversely extending slot 17, in which is positioned a pinion 18, the latter being rotatably carried on a pin 19 passing through the shaft, and of a diameter to engage the teeth 15 and 16 on the key members 11 and 13 respectively. The pin 19 may be secured in place by any suitable means, such as a press fit.

It will be apparent that as the discs 4 and 5 and key members 11 and 13 are slidable along the shaft 1, axial movement of one disc will be transmitted through the toothed or rack portion of its key member to the pinion 18, causing rotation of the latter, which will in turn cause movement of the other key member and the other disc in a direction opposite to the direction of movement of the first disc. Thus any axial movement of the discs 4 and 5 will be divided between the two, and a belt riding between the discs will be positioned on a fixed center line, regardless of the amount of separation between the two discs and the pitch diameter then being utilized.

Secured to the end of the shaft 1, adjacent the disc 5 is a cap member 21, secured to the shaft by any suitable means, such as the pin 22, passing through the cylindrical shoulder 23 of the cap 21. The latter is provided with an annular shoulder 24, against which is seated one end of a compression spring 25, the opposite end of the latter bearing against the disc 5 to urge the latter towards the disc 4, and acting through the pinion 18 and key member 13 to urge the disc 4 towards the disc 5. The spring 25 is covered by a tubular protective sleeve 26, having an inwardly extending flange 27 adjacent the cap 24, whereby the spring will firmly retain the sleeve 26 in position. The disc 5 is also provided with a concentric annular flange 28, having an inner diameter slightly larger than the outer diameter of the sleeve 26, and cooperable therewith to efficiently seal the spring 25 and the adjacent end of the shaft and associated parts from dust, dirt, etc., as well as provide a grease retainer for the retention of lubricant, the relative longitudinal dimensions of the sleeve 26 and flange 28 being such that portions of the two are constantly overlapped, but permit axial movement therebetween. The cap 21 may be provided with a bore 31, closed at its outer end by a suitable grease fitting 32, whereby lubrication may be forced into the end of the shaft 1 to provide lubrication of the moving parts. The opposite end of the shaft 1 is provided with a circumferential groove 33, in which may be positioned a spring ring 34, the latter limiting the maximum outward movement of the disc 4. Obviously, the outward movement of the disc 5 is limited by the shoulder 24 on the cap 21, which will stop outer movement of the disc 5 when the key member 13 strikes the same. Thus, if for any reason the separating mechanism is rendered inoperative and the discs 4 and 5 separated, such separation would be so limited that the smallest operating pitch diameter would be obtained, at which pitch diameter the pulley could still be operated without rendering the machine or device on which it is used inoperative. The compression spring 25 is of such a length that sufficient pressure will be exerted on the belt, regardless of its position, to insure satisfactory operation.

It will be noted that the rack and pinion construction permits any desired amount of separation of the pulley halves, dependent upon the length of the toothed portions of the key members, the length of the supporting shaft and that of the spring, as there is no mechanical limit upon the operation of the key members and the pinion, in contrast to previous structures having mechanical limitations that restrict the maximum amount of separation that can be obtained. Thus the present invention may be utilized to obtain a considerable operating range between maximum and minimum pitch diameters.

The device may be assembled in the following manner:

First, the key members 11 and 13 are secured to their respective hubs 6 and 7 by means of the pins 12 and 14, and the pinion 18 assembled in the shaft 1. The disc 5 and key member 13 are then slid upon the shaft 1, the teeth on the key member being engaged with the pinion 18, and the disc 5 moved in its outward direction to a point beyond its normal maximum outward position. The disc 4 and key member 11 are then slid upon the shaft until the teeth on the key member 11 engage the pinion 18, after which both discs are moved towards each other until they are brought together, the key members 11 and 13 being thus simultaneously engaged by the pinion as shown in Fig. 1. The spring 25 and sleeve 26 are then applied, the adjacent free ends thereof being moved towards the disc 5 a sufficient distance to expose the end of the shaft 1 and permit the cap 21 to be engaged therewith, and the pin 22 passed through both the shaft and the cap, following which the spring 25 and sleeve 26 are released, whereby expansion of the spring will force the flange 27 of the sleeve 26 into engagement with the cap 21. It will be apparent that this invention may be readily adapted for use on multiple belt pulleys, having two or more pairs of pulley halves or discs, merely by lengthening the shaft 1 and key members 11 and 13, sliding on additional pairs of pulley discs similar to the discs 4 and 5, and pinning or otherwise securing corresponding discs to the respective key members so that corresponding discs will move together on their respective key members.

It will be noted from the above description that I have provided a variable pitch pulley, which may be operated over a very wide range of pitch diameters while maintaining a fixed belt center line, in which all driving torque is transmitted directly from the pulley discs to the pulley shaft through a pair of key members, with none of the driving torque transmitted through the equalizing pinion 18.

It will also be noted that only one movable element, namely, the pinion 18, is employed, other than the two movable pulley discs and the members 11 and 13, which are rigidly connected to the respective halves or discs.

Having thus described my invention, it is obvious that various immaterial modifications may be made in the same without departing from the spirit of my invention; hence, I do not wish to be understood as limiting myself to the exact form, construction, arrangement and combination of parts herein shown and described, or uses mentioned.

What I claim as new and desire to secure by Letters Patent is:

1. In a variable pitch pulley, the combination of a shaft member, a pair of opposed pulley halves supported on said shaft and axially slidable relative to the latter and to each other, each of said pulley halves and said shaft having a pair of diametrically positioned key-ways in their adjoining surfaces, a pair of key members positioned in the respective key-ways, one member being secured to each pulley half and slidable in respective cooperating key-ways in the other half and said shaft, said key members each having a plurality of teeth formed along their opposed surfaces, a rotatable pinion carried by said shaft member, the teeth of which engage the teeth of each key member, and means operatively related to said shaft and one pulley half for maintaining the two halves in engagement with a belt positioned therebetween.

2. In a variable pitch pulley, the combination of a shaft member, a pair of opposed pulley halves supported on said shaft and axially slidable relative to the latter and to each other, said shaft having a pair of key-ways therein, each pulley half having a key member rigidly connected thereto, positioned in one of the key-ways in said shaft member, said key members each having a plurality of teeth formed along their opposed surfaces, a rotatable pinion carried by said shaft member, the teeth of which engage the teeth of each key member, an annular shoulder extending outwardly from and rigidly carried by said shaft, and a compression spring encircling said shaft, having one end operatively seated on one pulley half and the other end operatively seated on said shoulder for urging such pulley half towards the other half.

3. In a variable pitch pulley, the combination of a shaft member, a pair of opposed pulley halves supported on said shaft and axially slidable relative to the latter and to each other, said shaft having a pair of key-ways therein, each pulley half having a key member rigidly connected thereto, positioned in one of the key-ways in said shaft member, said key members each having a plurality of teeth formed along their opposed surfaces, a rotatable pinion carried by said shaft member, the teeth of which engage the teeth of each key member, and means operatively related to said shaft and one pulley half for maintaining the two halves in engagement with a belt positioned therebetween.

4. In a variable pitch pulley, the combination of a shaft member, a pair of opposed pulley halves supported on said shaft and axially slidable relative to the latter and to each other, said shaft having a pair of key-way grooves in the peripheral face thereof, each pulley half having an inwardly extending key member rigidly connected thereto, positioned in one of the key-ways in said shaft member, means carried by said shaft operatively connecting said key members for transmitting axial movement of one pulley half in one direction, to the other pulley half, but in the opposite direction, and means for maintaining the two pulley halves in engagement with a belt positioned therebetween.

5. In a variable pitch pulley, the combination of a shaft member provided at one end with means for connecting the same to a driving or driven shaft, a pair of opposed pulley halves, each having a hub portion slidably mounted on said shaft member, the latter and each shaft receiving bore of the respective hub portions having a pair of diametrically positioned key-ways therein, a pair of key members positioned in the respective key-ways, one member being secured to each pulley half and slidable in the respective cooperating key-ways in the other pulley half and said shaft member, said key members each having a plurality of teeth formed along their opposing surfaces, said shaft having a slot extending transversely therethrough aligned with said key-ways, a pinion positioned in said slot and rotatably mounted on a bearing pin carried by said shaft member, the teeth of said pinion being engaged with the teeth on each key member, a cap member positioned adjacent the free end of and carried by said shaft member and having a substantially axially extending lubrication passage therein, said cap member being of a greater diameter than said shaft member to form an annular shoulder positioned opposite the adjacent pulley half, a compression spring encircling said shaft member, operatively seated at one end on the last mentioned pulley half, and the other end operatively seated on said shoulder, and a protective sleeve encircling said shaft and spring, and cooperable with a concentric annular flange on the adjacent pulley half.

6. In a variable pitch pulley, the combination of a shaft member provided at one end with means for connecting the same to a driving or driven shaft, a pair of opposed pulley halves, each having a hub portion slidably mounted on said shaft member, the latter and each shaft receiving bore of the respective hub portions having a pair of diametrically positioned key-ways therein, a pair of key members positioned in the respective key-ways, one member being secured to each pulley half and slidable in the respective cooperating key-ways in the other pulley half and said shaft member, said key members each having a plurality of teeth formed along their opposing surfaces, said shaft having a slot extending transversely therethrough aligned with said key-ways, a pinion positioned in said slot and rotatably mounted on a bearing pin carried by said shaft member, the axes of the latter and of said pin intersecting, the teeth of said pinion being engaged with the teeth on each key member, a cap member positioned adjacent the free end of and carried by said shaft member, said cap member being of a greater diameter than said shaft member to form an annular shoulder positioned opposite the adjacent pulley half, a compression spring encircling said shaft member, operatively seated at one end on the last mentioned pulley half, and the other end operatively seated on said shoulder, and means carried by said shaft for limiting the maximum outward axial movement of the other pulley half.

7. In a variable pitch pulley, the combination of a shaft member, a pair of opposed pulley halves supported on said shaft and axially slidable relative to the latter and to each other, each of said pulley halves and said shaft having a pair of diametrically positioned key-ways in their adjoining surfaces, a pair of key members positioned in the respective key-ways, one member being secured to each pulley half and slidable in respective cooperating key-ways in the other half and said shaft, said key members each having a plurality of teeth formed along their opposed surfaces, a rotatable pinion carried by said shaft member, the teeth of which engage the teeth of each key member, an annular shoulder extending outwardly from and rigidly carried by said shaft, and a compression spring encircling said shaft, having one end operatively seated on one pulley half and the other end operatively seated on said shoulder for urging such pulley half towards the other pulley half 8. In a variable pitch pulley, the combination of a shaft member provided at one end with means for connecting the same to a driving or driven shaft, a pair of opposed pulley halves, each having a hub portion slidably mounted on said shaft member, the latter and each shaft receiving bore of the respective hub portions having a pair of diametrically positioned key-ways therein, a pair of key members positioned in the respective key-ways, one member being secured to each pulley half and slidable in the respective cooperating key-ways in the other pulley half and said shaft member, said key members each having a plurality of teeth formed along their opposing surfaces, said shaft having a slot extending transversely therethrough aligned with said key-ways, a pinion positioned in said slot and rotatably mounted on a bearing pin carried by said shaft member, the teeth of said pinion being engaged with the teeth on each key member, a cap member positioned adjacent the free end of and carried by said shaft member, said cap member being of a greater diameter than said shaft member to form an annular shoulder positioned opposite the adjacent pulley half, and a compression spring encircling said shaft member, operatively seated at one end on the last mentioned pulley half, and the other end operatively seated on said shoulder.

9. In a variable pitch pulley, the combination of a shaft member provided at one end with means for connecting the same to a driving or driven shaft, a pair of opposed pulley halves, each having a hub portion slidably mounted on said shaft member, the latter and each shaft receiving bore of the respective hub portions having a pair of diametrically positioned key-ways therein, a pair of key members positioned in the respective key-ways, one member being secured to each pulley half and slidable in the respective cooperating key-ways in the other pulley half and said shaft member, said key members each having a plurality of teeth formed along their opposing surfaces, said shaft having a slot extending transversely therethrough aligned with said key-ways, a pinion positioned in said slot and rotatably mounted on a bearing pin carried by said shaft member, the axis of the latter and of said pin intersecting, the teeth of said pinion being engaged with the teeth on each key member, a cap member positioned adjacent the free end of and carried by said shaft member and having a substantially axially extending lubrication passage therein, said cap member being of a greater diameter than said shaft member to form an annular shoulder positioned opposite the adjacent pulley half, a compression spring encircling said shaft member, operatively seated at one end on the last mentioned pulley half, and the other end operatively seated on said shoulder, a protective sleeve encircling said shaft and spring and cooperable with a concentric annular flange on the adjacent pulley half, and means carried by said shaft for limiting the maximum outward axial movement of the other pulley half.

10. In a variable pitch pulley, the combination of a shaft member, a pair of opposed pulley halves supported on said shaft and axially slidable relative to the latter and to each other, said shaft having a pair of key-ways therein, each pulley half having a key member rigidly connected thereto, positioned in one of the key-ways in said shaft member, said key members each having a plurality of teeth formed along their opposed surfaces, a rotatable pinion carried by said shaft member, the teeth of which engage the teeth of each key member, and means for maintaining the two pulley halves in engagement with a belt positioned therebetween.

11. In a variable pitch pulley, the combination of a shaft member, a pair of opposed pulley halves supported on said shaft and axially slidable relative to the latter and to each other, each of said pulley halves and said shaft having a pair of diametrically positioned key-ways in their adjoining surfaces, a pair of key members positioned in the respective key-ways, one member being secured to each pulley half and slidable in respective cooperating key-ways in the other half and said shaft, said key members each having a plurality of teeth formed along their opposed surfaces, a rotatable pinion carried by said shaft member, the teeth of which engage the teeth of each key member, and means for maintaining the two pulley halves in engagement with a belt positioned therebetween.

WILLARD E. GERBING.

REFERENCES CITED

The following references are of record in the file of this patent:

UNITED STATES PATENTS

| Number | Name | Date |
| --- | --- | --- |
| 2,117,485 | Lewellen | May 17, 1938 |
| 2,120,383 | Watson | June 14, 1938 |
| 2,203,149 | Hoover | June 4, 1940 |